(12) United States Patent
Odachowski

(10) Patent No.: US 6,860,031 B2
(45) Date of Patent: *Mar. 1, 2005

(54) TAPE MEASURE

(75) Inventor: Mark Odachowski, Ocean City, MD (US)

(73) Assignee: Irwin Industrial Tool, Company, Huntersville, NC (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/327,150

(22) Filed: Dec. 20, 2002

(65) Prior Publication Data

US 2003/0093913 A1 May 22, 2003

Related U.S. Application Data

(63) Continuation-in-part of application No. 09/494,935, filed on Feb. 1, 2000, now Pat. No. 6,651,354.

(51) Int. Cl.[7] .................................................. G01B 3/10
(52) U.S. Cl. .............................. 33/755; 33/757; 33/759
(58) Field of Search ........................ 33/755, 757, 759, 33/760, 761, 764, 767, 769, 770, 494

(56) References Cited

U.S. PATENT DOCUMENTS

| | | |
|---|---|---|
| 1,081,673 A | 12/1913 | Kueffel |
| 1,986,551 A | 1/1935 | Anderson ..................... 33/769 |
| 2,956,795 A | 10/1960 | Foster |
| 3,164,907 A | 1/1965 | Quenot |
| 3,270,421 A | 9/1966 | Jones |
| 3,289,305 A | 12/1966 | Norton |
| 3,686,767 A | 8/1972 | Duda et al. |
| 3,774,309 A | 11/1973 | Leopoldi ..................... 33/769 |
| 3,908,277 A | 9/1975 | Rutty |
| 4,153,996 A | 5/1979 | Rutty |
| 4,194,703 A | 3/1980 | Roe |
| 4,352,244 A | 10/1982 | Tomuro |
| 4,439,927 A | 4/1984 | Elliott |
| 4,462,160 A | 7/1984 | Cohen et al. ................. 33/760 |
| 4,603,481 A | 8/1986 | Cohen et al. |
| 4,696,110 A | 9/1987 | Walker et al. |
| 4,748,746 A | 6/1988 | Jacoff |
| 4,938,430 A | 7/1990 | Chapin |
| 5,210,956 A | 5/1993 | Knispel ....................... 33/761 |
| 5,245,761 A | 9/1993 | Waldherr |
| 5,657,551 A | 8/1997 | Lin |
| 5,718,056 A | 2/1998 | Miyasaka et al. ............. 33/761 |
| 5,894,677 A | 4/1999 | Hoffman |
| 5,913,586 A | 6/1999 | Marshall ...................... 33/759 |
| 5,983,514 A | 11/1999 | Lindsey ....................... 33/755 |
| 6,161,299 A | 12/2000 | Lin |
| 6,243,964 B1 | 6/2001 | Murray |
| 6,598,310 B1 * | 7/2003 | Odachowski ................ 33/755 |
| 6,651,354 B1 * | 11/2003 | Odachowski ................ 33/755 |

FOREIGN PATENT DOCUMENTS

DE 39 37 319 A1 5/1991

OTHER PUBLICATIONS

International Search Report for corresponding international patent application, PCT/US02/29442, dated Apr. 14, 2003.

* cited by examiner

Primary Examiner—G. Bradley Bennett
(74) Attorney, Agent, or Firm—Dennis J. Williamson; Moore & Van Allen, PLLC

(57) ABSTRACT

An improved retractable tape measure has, according to a preferred embodiment of the present invention, a housing having a front and a top portion, an opening located in the front portion ad proximate the top portion, a retractable measuring tape with top and bottom surfaces, edges that turn upward so as to stiffen the tape from being bent downward by the force of gravity, a free end that extends through the opening, an end stop that is mounted on the tape's free end, top measurement indicia that are inscribed on the top surface of the measuring tape, and bottom measurement indicia on the bottom surface of the measuring tape, wherein the location of the housing opening is such that the housing can be held in close proximity to an overhead surface without having to bend the tape to move the housing away from the overhead surface.

13 Claims, 6 Drawing Sheets

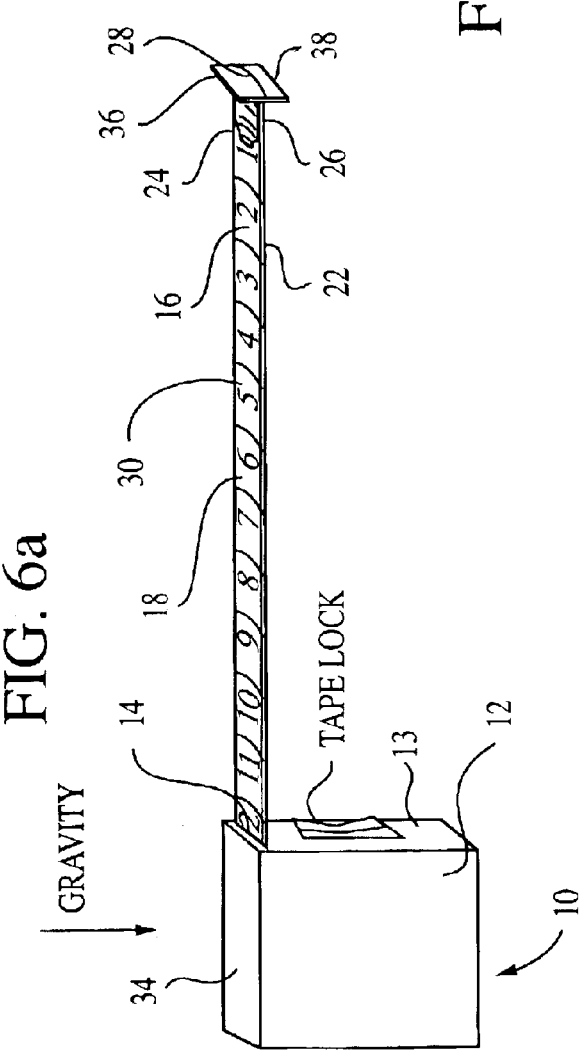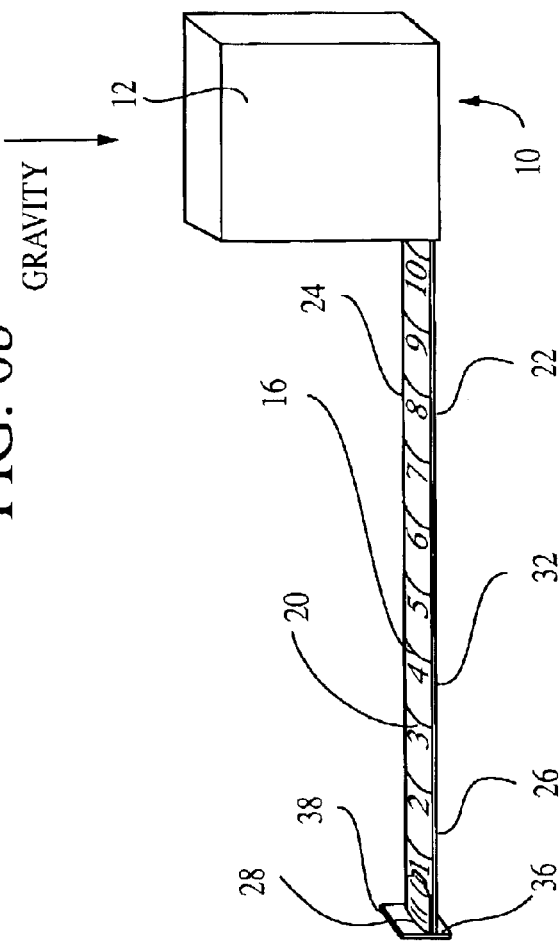

TAPE MEASURE

CROSS-REFERENCE TO RELATED APPLICATIONS

This application is a continuation-in-part of applicant's application U.S. Ser. No. 09/494,935 filed Feb. 1, 2000, now U.S. Pat. No. 6,651,354 and titled "Tape Measure."

BACKGROUND OF THE INVENTION

1. Field of the Invention

The present invention generally relates to geometrical instruments for measuring distance. More particularly, this invention relates to an improved retractable, tape measure.

2. Description of the Related Art

Retractable tape measures have been popular for many years and have often been the subject of patent grants. For example, see U.S. Pat. Nos. 3,908,277, 4,153,996, 4,194,703, 4,439,927, 4,748,746, 4,938,430, 5,210,956 and 5,983,514.

In general, a retractable tape measure includes some widely recognized features, including: a metal tape that is retractably mounted within a housing, a retraction means for retracting the tape through a housing opening, an end stop for preventing the free end of the tape from retracting into the housing, and a lock which releasably secures the tape in an extended position. In order to provide stiffness to such a tape so that it's free end can extended to a maximum distance from its housing without bending, the tape is usually manufactured with lateral cross-section curvature created by having the tape's ends turned upward. This curvature also serves to differentiate the top side of the tape.

All of the above referenced tapes also share some other, not so widely recognized, features which serve to significantly limit their usefulness. These features include all these tapes having: (1) retractable tapes that extend from their housings at a point on the side of the front side of the housings which is proximate the housing's bottom surfaces, and (2) measurement indicia on only the top surface of the tape.

The reason for these features is apparently that such tapes are primarily intended for use in making measurements on surfaces or in planes that are lower than the eye level of the user, and where there are no obstructions above the plane of a desired measurement which would necessitate a user having to bend the tape downward so as to reposition the top portion of a tape's housing out of the way of such an obstruction. The logic of this last statement becomes apparent when it is recognized that the turned upward edges of the tape destroys its vertical symmetry, and means that such a tape cannot just be turned over, so as to make the tape's top surface indicia visible or to reposition the top portion of the housing out of the way of an obstruction, without losing the stiffening and avoidance-to-bending characteristics provided by the tape's turned upward edges.

Thus, despite their popularity, such standard tape measures are not always easy to use. For example, electricians and others often encounter significant problems in using a standard tape measure when they are making measurements from a wall to a distant spot that is more than an arms length away on an adjoining ceiling. See FIGS. 1–2. The first obstacle encountered is the lack of any markings on the tape's bottom side. Meanwhile, the numbers on the tape's top side cannot be seen by its user while he/she is holding the tape up against the ceiling. Unfortunately, as noted above, the tape cannot be turned over or the top portion of the tape's housing moved away from the ceiling without losing the stiffening effect of the tape's turned-up edges.

U.S. Pat. No. 1,986,551 discloses a steel, retractable tape which has indicia on the tape's bottom surface and at least some degree of lateral cross-section curvature. However, this tape measure differs from most of the others in that it has some unique, essential elements. For example, the end stop of this tape measure is rotatable to allow for the making "inside and outside" measurements. Similarly, the opening for this tape measure is unusual in that it can be interpreted as having a continuous boundary edge that extends from 34,' where the edge of the housing forms a line at which "inside" measurements are taken, and follows the inside edges of the guide shoes 14 and 15 so as to ensure that "all of the graduations and all of the numbers (on the tape) are fully exposed and easily readable."

Thus, despite this prior art, one finds that standard, tape measures are not very user friendly. The need exists for an improved, retractable tape measure that is easier to use.

3. Objects and Advantages

There has been summarized above, rather broadly, the prior art that is related to the present invention in order that the context of the present invention may be better understood and appreciated. In this regard, it is instructive to also consider the objects and advantages of the present invention.

An object of the present invention is to provide an improved, retractable tape measure that will overcome user problems such as the one described above.

Another object of the present invention is to provide an improved, retractable tape measure that can be used, for measuring extended distances, just as easily when those distances are on a ceiling or a floor.

Other objects and advantages of the present invention will become readily apparent as the invention is better understood by reference to the accompanying drawings and the detailed description that follows.

SUMMARY OF THE INVENTION

The present invention is generally directed to satisfying the need set forth above and the problems identified with prior retractable, tape measures.

This present invention is an improved, retractable tape measure. It is an improvement of the standard retractable tape measure which has a housing with an opening through which is extended and retracted a measuring tape which has a top and bottom surface, turned-up edges, a free end and top measurement indicia inscribed on the top surface of the tape. Such a tape is seen to be improved by the inclusion of bottom measurement indicia on the bottom surface of the tape, and locating the housing opening in the front portion and proximate the top portion of the housing so that, when the tape measure is being used to measure against an overhead surface, the portion of the tape that is extending through the opening and in closest proximity to the housing can be held in close proximity to the overhead surface without having to bend the tape to move the housing away from the overhead surface.

Other embodiments of the present invention will become readily apparent as the invention is better understood by reference to the accompanying drawings and the detailed description that follows.

BRIEF DESCRIPTION OF THE DRAWINGS

FIG. 6 is a perspective view of an embodiment of the present invention shown in (a) in its upright position so that the tape's edges are turned upward against gravity, and in (b) when it has been turned over to get the housing out of the way when a measurement is being made on a floor.

DESCRIPTION OF THE PREFERRED EMBODIMENT

Figure 3:
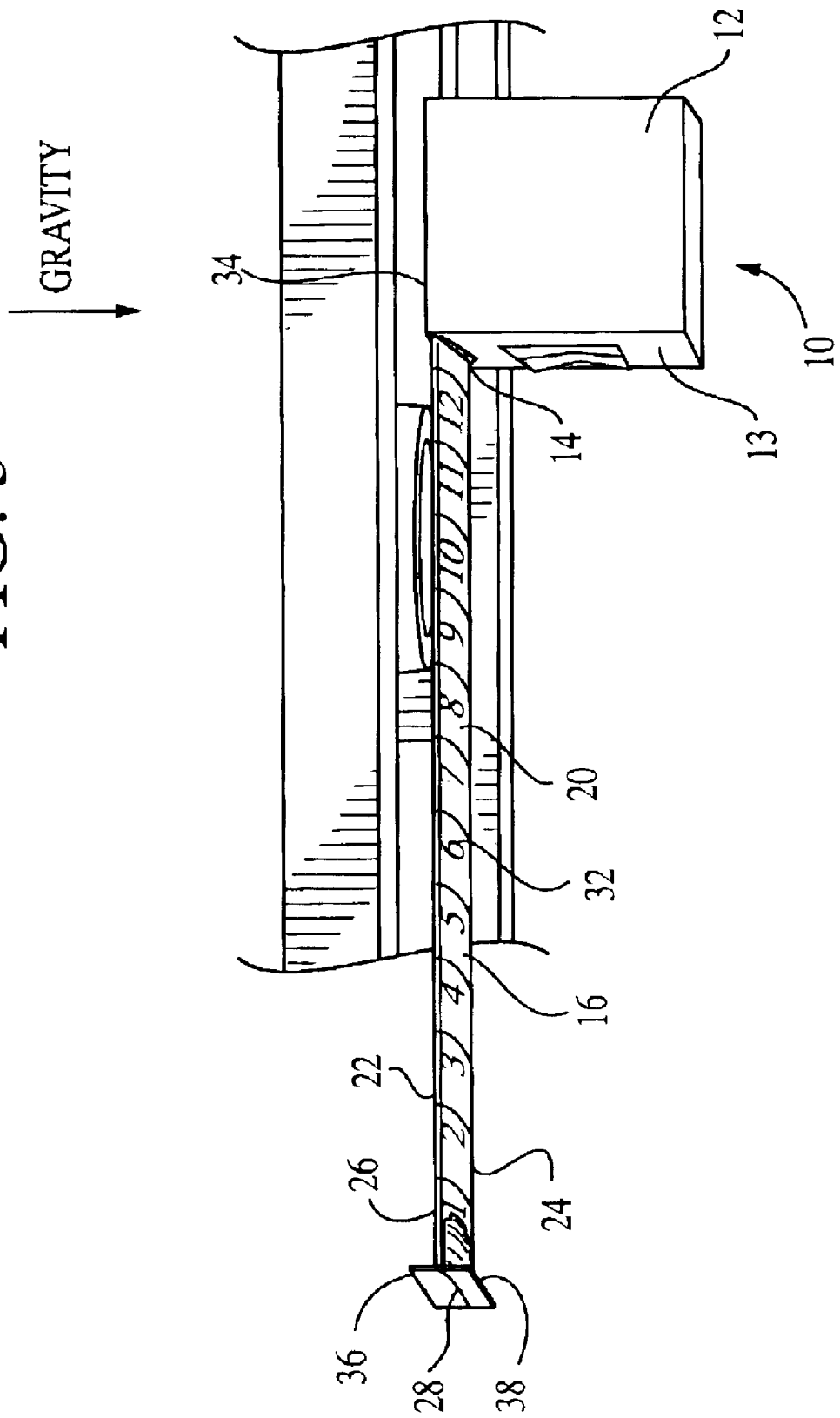
FIG. 3 is a perspective view of an embodiment of the present invention when viewed from below.

Referring now to the drawings wherein are shown preferred embodiments and wherein like reference numerals designate like elements throughout, there is shown in FIG. 3 a perspective view of an embodiment of the present invention in the form of an improved retractable, tape measure (10).

This embodiment includes a housing (12) having an opening (14), a retractable measuring tape (16) with top (18) and bottom (20) surfaces, edges (22, 24) that turn upward so as to stiffen the tape (16) from being bent downward by the force of gravity, and a free end (26) that extends through the opening (14).

This embodiment further includes an end stop (28) that is mounted on the tape's free end (26), and top measurement indicia (30) that are inscribed on the top surface (18) of the measuring tape (16).

Additionally, this embodiment is seen to be have been improved by the inclusion of bottom measurement indicia (32) on the bottom surface (20) of the measuring tape (16), and the location of the housing opening (14) in the front portion (13) and proximate the top portion (34) of the housing (12) so that, when the tape measure (10) is being used to measure against an overhead surface with the edges (22, 24) being held adjacent the overhead surface, the portion of the tape (16), that extends through the opening (14) and is in closest proximity to the housing (12), can be held in close proximity to the overhead surface without having to bend the tape (16) to move the housing (12) away from the overhead surface.

Figure 4:
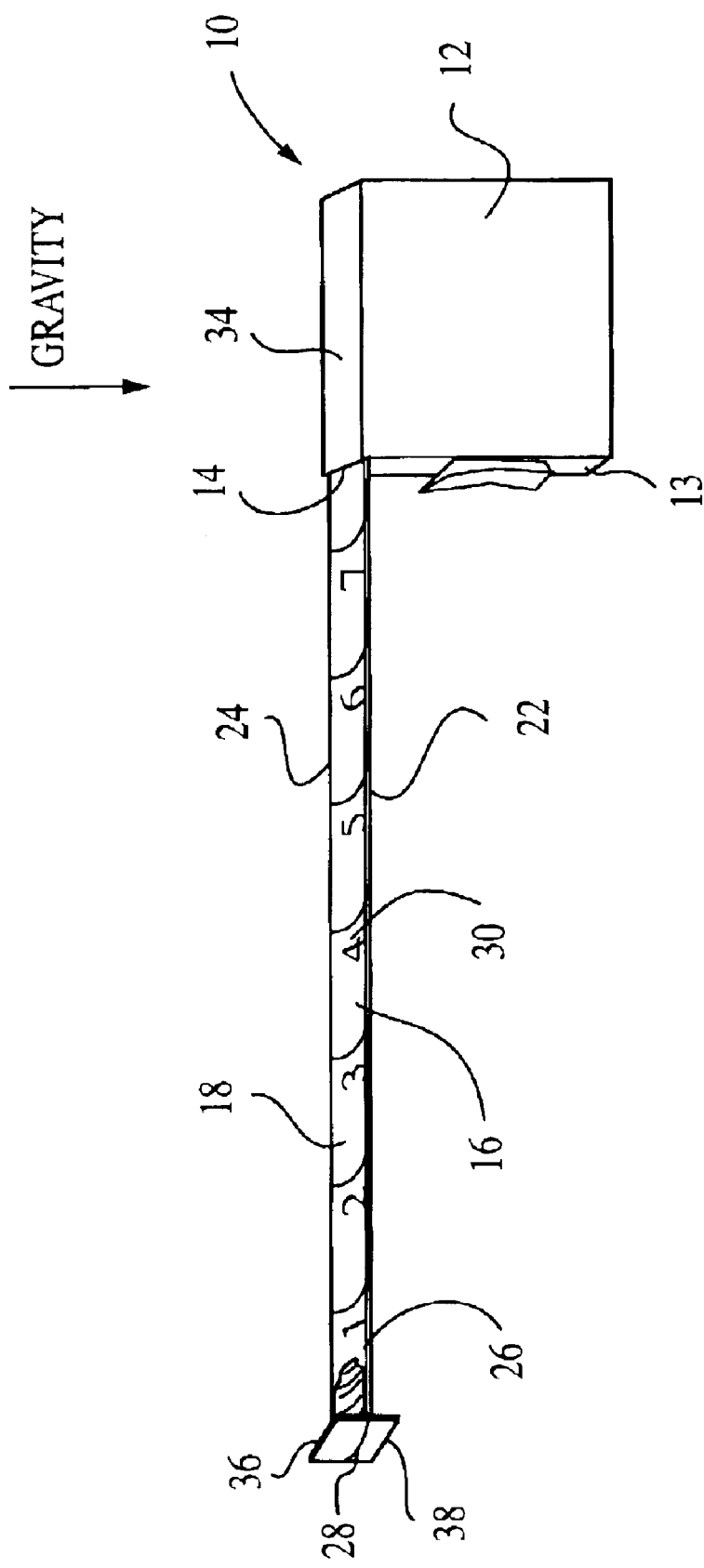
FIG. 4 is a perspective view of an embodiment of the present invention when viewed from above.

The elements of this embodiment are further seen in FIG. 4 which shows the present invention when viewed from above.

Figure 1:
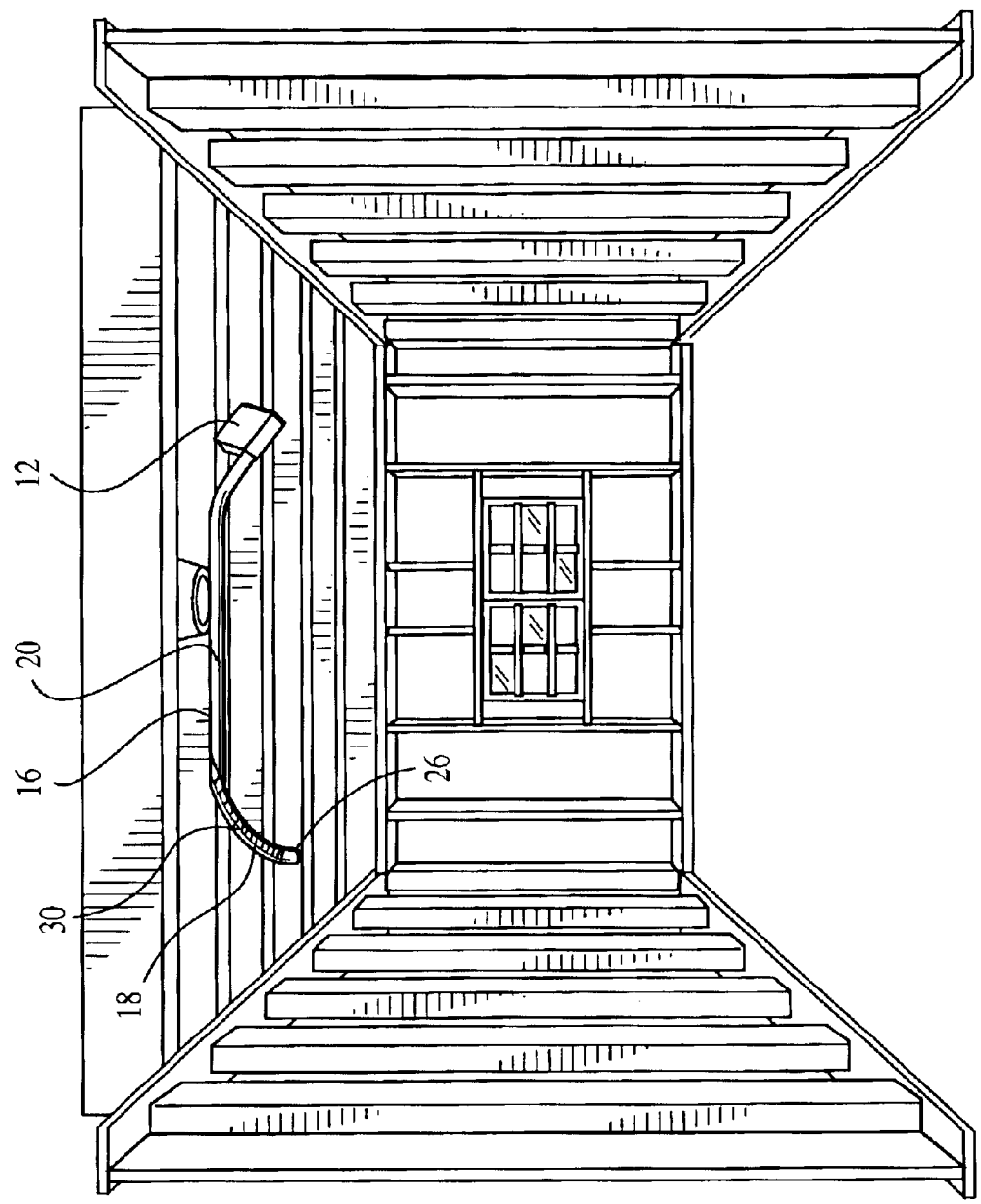
FIG. 1 is a perspective view of a standard, retractable tape measure as it is being used to make a measurement beneath a ceiling.
Figure 2:
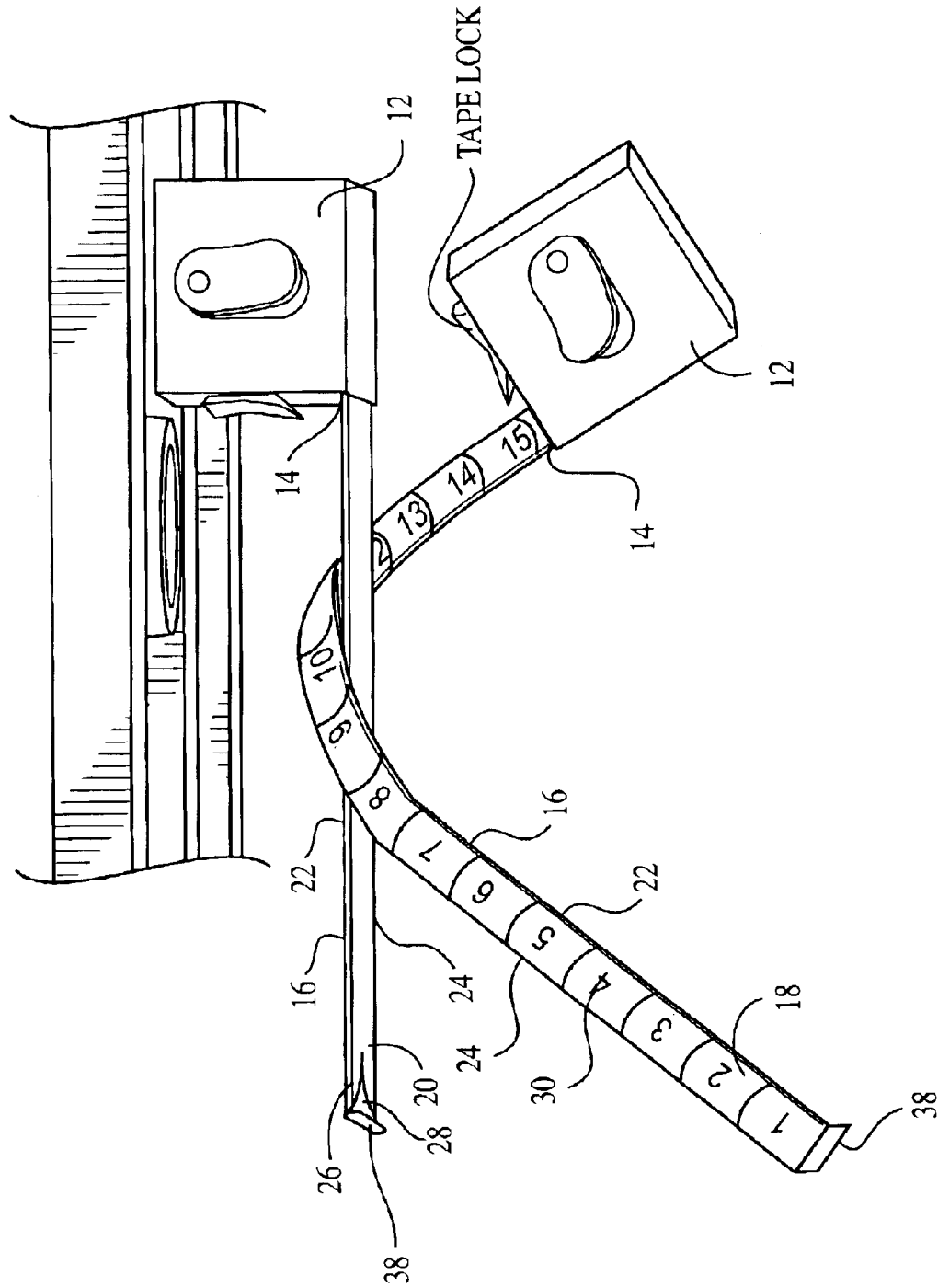
FIG. 2 is a perspective view of a standard tape measure showing some of the problems that can be encountered in using such a tape measure.
Figure 5:
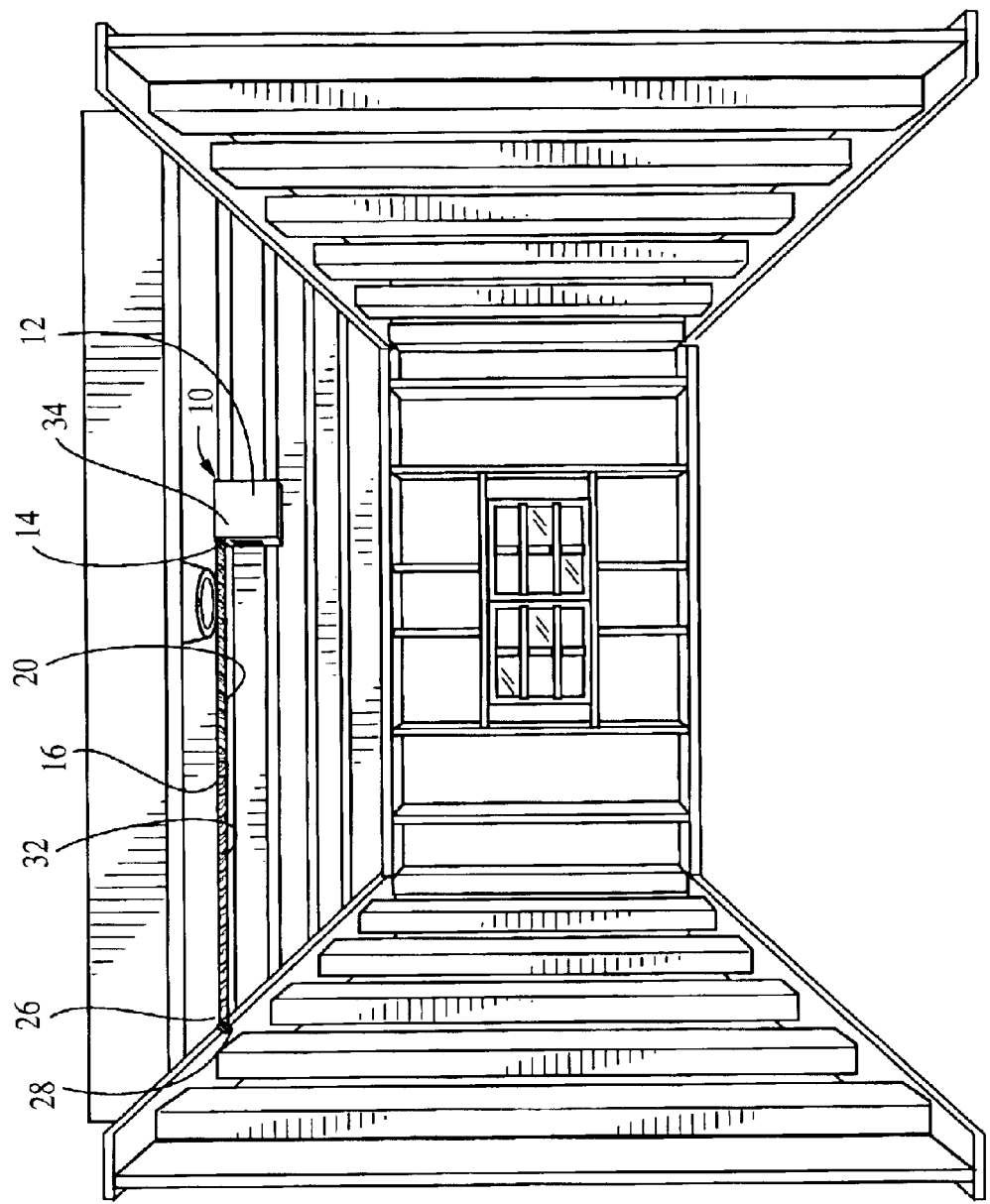
FIG. 5 is a perspective view of an embodiment of the present invention being used to make the same measurement previously shown in FIG. 1

The advantages of the present invention for making measurements against overhead surfaces are further seen in FIG. 5 which shows the present invention being used to make the same measurement previously shown in FIG. 1-2. The addition of bottom measurement indicia (32) on the bottom surface (20) of the tape (1) are seen to eliminate the previous need to bend the tape downward and away from the ceiling to allow the numbers (30) to be read on the top surface (18) of the tape (16). Also, the location of the housing opening (14) in the front (13) and proximate the top portion (34) of the housing eliminates the need to move the bulk of the housing (12) downward and away from the ceiling.

This embodiment of the present invention is also seen to be as easy to use as a standard tape measure when making measurement on a floor. For such measurements, the present invention is just rotated 180 degrees so as to allow the top portion (34) of the housing (12) to be placed directly on the floor. As shown in FIG. 6(b), the tape's edges (22, 24) now point toward the floor and thus no longer aid in stiffening the extended length of the tape (16). However, this is not a problem, since the top surface (18) of the tape (6) can actually lie against the floor.

Furthermore, because the tape of the present invention is made to be rotated 180 degrees and used, the tape's end stop (28) is configured so that it has upper (36) and lower (38) fingers that extend, respectively, above and below the tape's top (18) and bottom (20) surfaces. Thus, when such a tape (10) is rotated, the end stop (28) can still easily be hooked onto a protuberance or slot in a floor so as to locate or tie-down the free end (26) of the tape in order to make a specific measurement on the floor. Additionally, it can be noted that the portion of the end stop (28), which extends and fastens to the end of the free end (26) of the tape, has been configured so that it helps to maintain the cross-sectional curvature in the tape.

While the invention has been described in combination with embodiments thereof it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

I claim:

1. A retractable tape measure comprising:

a housing having a tape opening, a top portion and a front portion, said tape opening located in said front portion and in close proximity to said top portion, wherein said tape opening having a continuous boundary edge in which every portion of said boundary edge lying in close proximity to said front portion, said top portion including a portion for contacting a surface on an object to be measured, a retractable measuring tape positioned within said housing and having a top and a bottom surface, edges that turn upward in a direction toward said housing portion for contacting the surface of the object to be measured and turn upward along substantially an entire length of said tape when in use so as to stiffen said tape from being bent downward by the force of gravity, and a free end extending through said opening, a top measurement indicia inscribed on the top surface of said measuring tape, and a bottom measurement indicia inscribed on the bottom surface of said measuring tape.

2. A retractable tape measure as recited in claim 1, further comprising an end stop mounted on said free end.

3. A retractable tape measure as recited in claim 2, wherein said end stop having an upper finger that extends above said top surface and a lower finger that extends below said bottom surface.

4. A retractable tape measure as recited in claim 2, wherein said end stop configured for maintaining the upward turn of said edges of said tape at said free end in said direction toward said housing portion for contacting the surface of an object to be measured.

5. A retractable tape measure as recited in claim 3, wherein said end stop configured for maintaining the upward turn of said edges of said tape at said free end in said direction toward said housing portion for contacting the surface of an object to be measured.

6. An improved method of constructing a retractable tape measure having a housing including an opening, a top portion and a front portion, said top portion comprising a portion for contacting a surface of an object to be measured, a retractable measuring tape having a top and a bottom surface, edges, a free end extending through said opening, and a top measurement indicia inscribed on the top surface of said measuring tape, the improvement comprising the steps of:

inscribing a bottom measurement indicia on the bottom surface of said measuring tape, turning upward said tape edges in a direction toward said top portion for contacting the surface of an object to be measured and along substantially an entire length of said tape when in use so as to stiffen said tape and keep said tape from being bent downward by the force of gravity, and locating said opening in said front portion and proximate said top portion of said housing, wherein said tape opening having a continuous boundary edge in which every portion of said boundary edge lying in close proximity to said front portion.

7. An improved method of constructing a retractable tape measure as recited in claim 6, further comprising the step of providing said tape measure with an end stop mounted on said free end.

8. An improved method of constructing a retractable tape measure as recited in claim 7, wherein said end stop having an upper finger that extends above said top surface and a lower finger that extends below said bottom surface.

9. An improved method of constructing a retractable tape measure as recited in claim 7, further comprising the step of configuring said end stop for maintaining the upward turn of said edges of said tape at said free end in said direction toward said housing portion for contacting the surface of an object to be measured.

10. An improved method of constructing a retractable tape measure as recited in claim 8, further comprising the step of configuring said end stop for maintaining the upward turn of said edges of said tape at said free end in said direction toward said housing portion for contacting the surface of an object to be measured.

11. A retractable tape measure comprising:

a housing having a tape opening, a top portion and a front portion, said tape opening located in said front portion and in close proximity to said top portion, wherein said tape opening having a continuous boundary edge in which every portion of said boundary edge lying in close proximity to said front portion, said top portion including a portion for contacting a surface on an object to be measured, a retractable measuring means positioned within said housing and having a top and a bottom surface, and a free end extending through said opening, a top measurement indicia inscribed on the top surface of said measuring means, and a bottom measurement indicia inscribed on the bottom surface of said measuring means.

12. A retractable tape measure as recited in claim 11, further comprising an end stop mounted on said free end.

13. A retractable tape measure as recited in claim 12, wherein said end stop having an upper finger that extends above said top surface and a lower finger that extends below said bottom surface.

* * * * *